United States Patent
Berti et al.

(10) Patent No.: US 10,487,697 B2
(45) Date of Patent: Nov. 26, 2019

(54) HEAT RECOVERY IN CARBON DIOXIDE COMPRESSION AND COMPRESSION AND LIQUEFACTION SYSTEMS

(71) Applicant: Nuovo Pignone S.p.A., Florence (IT)

(72) Inventors: Matteo Berti, Florence (IT); Francesco Bellantone, Florence (IT); Marco De Iaco, Florence (IT); Paolo Del Turco, Florence (IT); Manuele Bigi, Florence (IT)

(73) Assignee: Nuovo Pignone S.P.S., Florence (IT)

( * ) Notice: Subject to any disclaimer, the term of this patent is extended or adjusted under 35 U.S.C. 154(b) by 41 days.

(21) Appl. No.: 13/705,834

(22) Filed: Dec. 5, 2012

(65) Prior Publication Data

US 2013/0139509 A1 Jun. 6, 2013

(30) Foreign Application Priority Data

Dec. 6, 2011 (IT) ................. FI2011A0262

(51) Int. Cl.
*F01K 25/10* (2006.01)
*F01K 13/00* (2006.01)

(52) U.S. Cl.
CPC ............ *F01K 25/103* (2013.01); *F01K 13/00* (2013.01); *F01K 25/10* (2013.01); *Y02E 20/14* (2013.01)

(58) Field of Classification Search
CPC .......... F01K 25/10; F01K 13/00; F01K 19/04; F04D 7/02; F04B 23/14
USPC ......... 60/39.5, 39.52, 653, 670; 62/613, 617
See application file for complete search history.

(56) References Cited

U.S. PATENT DOCUMENTS

| | | | |
|---|---|---|---|
| 4,747,749 A | 5/1988 | Sagnes | |
| 6,336,316 B1 * | 1/2002 | Fujii et al. | 60/791 |
| 6,430,914 B1 | 8/2002 | Goidich et al. | |
| 7,841,306 B2 * | 11/2010 | Myers | F01D 15/10 122/406.5 |
| 9,284,855 B2 * | 3/2016 | Held | F01K 13/02 |
| 2004/0250998 A1 | 12/2004 | Charron | |
| 2004/0253165 A1 | 12/2004 | Charron | |

(Continued)

FOREIGN PATENT DOCUMENTS

| | | |
|---|---|---|
| DE | 102009031309 | 1/2011 |
| DE | 102009032537 | 1/2011 |

(Continued)

OTHER PUBLICATIONS

Italian Search Report and Written Opinion from corresponding Italian PCT Application No. FI2011A000262, dated Dec. 4, 2012.

(Continued)

*Primary Examiner* — Mark A Laurenzi
*Assistant Examiner* — Shafiq Mian
(74) *Attorney, Agent, or Firm* — Baker Hughes Patent Organization (57) ABSTRACT

A carbon dioxide compression system is disclosed. The system comprises at as a first compressor stage and a second compressor stage arranged in series, at least one inter-stage heat exchanger arranged to receive a compressed gas containing carbon dioxide flowing from the first compressor stage into the second compressor stage and to remove waste heat from the compressed gas, and an energy conversion unit, wherein at least part of the waste heat is recovered and transformed into mechanical energy.

17 Claims, 6 Drawing Sheets

(56) References Cited

U.S. PATENT DOCUMENTS

| | | |
|---|---|---|
| 2008/0302107 A1 | 12/2008 | Fan et al. |
| 2010/0326131 A1* | 12/2010 | Lengert et al. ............... 62/512 |
| 2012/0111419 A1* | 5/2012 | Schwarz ..................... 137/14 |
| 2012/0216540 A1* | 8/2012 | Stoever et al. ............... 60/653 |

FOREIGN PATENT DOCUMENTS

| | | |
|---|---|---|
| EP | 0143684 | 10/1984 |
| EP | 0561065 A1 | 9/1993 |
| JP | 4-203397 | 7/1992 |
| JP | 2005002996 A | 1/2005 |
| JP | 2005002998 A | 1/2005 |
| RU | 2245446 C2 | 1/2005 |
| RU | 2433339 C2 | 11/2011 |

OTHER PUBLICATIONS

Extended European Search Report European Application No. 12194479.7, dated Feb. 5, 2013.
Unofficial English translation of Russian Office Action issued in connection with corresponding RU Application No. 2012154454 dated May 17, 2016.
Unofficial English translation of Japanese Rejection Notice issued in connection with corresponding JP Application No. 2012-257001 dated Aug. 16, 2016.
Unofficial English translation of Russian Notice of Allowance issued in connection with corresponding RU Application No. 2012154454 dated Dec. 19, 2016.

\* cited by examiner

HEAT RECOVERY IN CARBON DIOXIDE COMPRESSION AND COMPRESSION AND LIQUEFACTION SYSTEMS

BACKGROUND OF THE INVENTION

The embodiments disclosed relate to systems and methods for compressing, as well as compressing and liquefying, large volumes of carbon dioxide ($CO_2$) or gas mixtures containing carbon dioxide Carbon dioxide is produced in a variety of industrial processes, such as combustion or decarbonization processes of fossil fuels. Carbon dioxide capture, transportation, and storage contribute to the reduction of carbon dioxide emission.

Several carbon dioxide compression or compression and liquefaction processes have been developed and used. The commonly use serially arranged compression stages and inter-cooling. A carbon dioxide stream or a stream of a mixture comprising carbon dioxide sequentially flows through compression stages arranged in series such that the pressure of the carbon dioxide or carbon dioxide mixture is gradually increased. The compressed carbon dioxide or mixture containing carbon dioxide exiting one compression stage is cooled in an inter-stage heat exchanger before entering the next compression stage, to remove heat therefrom. The stream of compressed carbon dioxide or mixture containing carbon dioxide exiting the last compression stage is eventually finally cooled, liquefied and pumped by a cryogenic pump up to the final pressure. In some cases the carbon dioxide or a mixture containing carbon dioxide is brought to a gaseous, high-density status but not liquefied.

Figure 1:
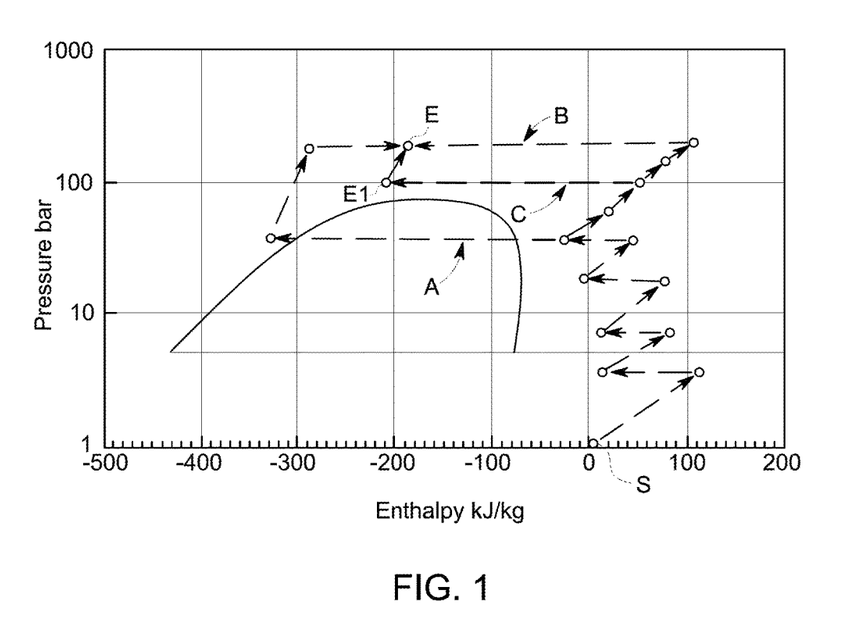
FIG. 1 illustrates the enthalpy-pressure diagram of carbon dioxide.

FIG. 1 shows the carbon dioxide enthalpy-pressure diagram wherein the start (S) and the end (E) points of a compression process are illustrated. Several possibilities are available to move from point S to point E, depending upon the process used. FIG. 1 schematically illustrates three curves A, B and C representing three alternative carbon dioxide compression processes. The horizontal portions of the curves are the inter-stage cooling phases, where heat is removed from the carbon dioxide stream from one compression stage before entering the next compression stage, to at least partly remove the heat generated by the previous compression and increase gas density.

Curve A shows a process wherein inter-stage cooling and liquefaction are combined. The gas is firstly compressed along, a plurality of compression steps (5 in the example) and inter-stage cooling. The compressed gas is liquefied and finally reexpanded to a supercritical condition (point E).

Curve B shows a process where the supercritical point E is achieved by sequential compression and inter-stage cooling steps.

Curve C shows a process where the carbon dioxide or carbon dioxide-containing stream is compressed and cooled down until a condition E1 is achieved, from where the final point E is reached by pumping.

Figure 2:
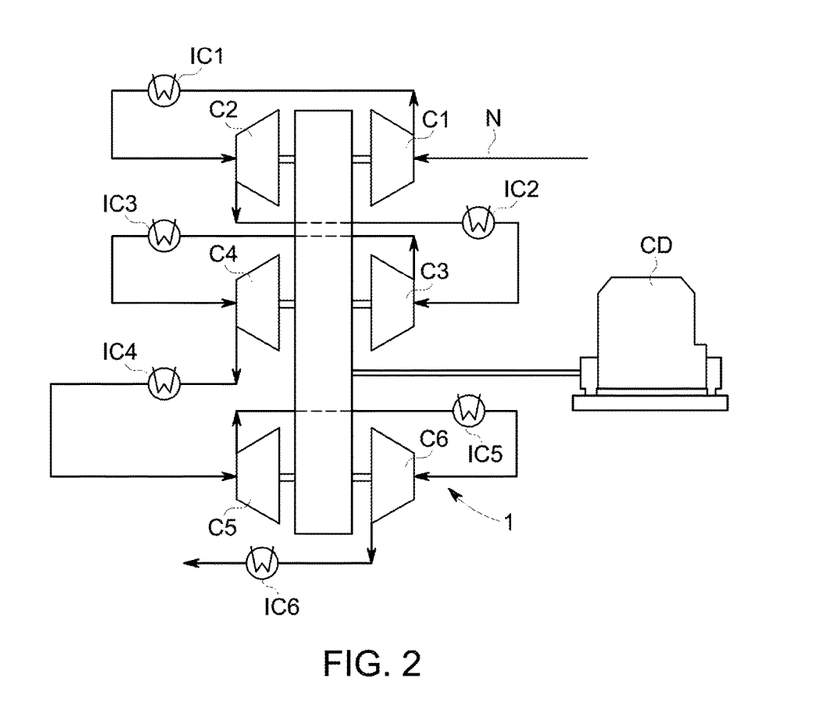
FIG. 2 schematically illustrates a compression system according to the state of the art.

FIG. 2 illustrates a schematic of a carbon dioxide compression system according to the state of the art. Only the major components of the system are shown in the figure. A plurality of serially arranged compressor stages, labeled C1-C6, is driven by a compressor driver CD, e.g. an electric motor. Each compressor stage (six in the example shown) usually comprises a centrifugal compressor. Carbon dioxide (or a gas mixture containing carbon dioxide) is fed at IN to the first compressor stage C1 and exits said first compressor stage to enter the second compressor stage C2 and so on. In each compressor stage the carbon dioxide is subject to a compression phase to increase the pressure from an inlet pressure to an outlet pressure. Between each pair of sequentially arranged compressor stages inter-stage cooling is provided. This is schematically represented by a respective inter-stage heat exchanger (intercooler) labeled IC1, IC2, . . . IC5. The compressed carbon dioxide delivered by the downstream compression stage C6 is further cooled in a final heat exchanger IC6. Depending upon the circumstances, further processing steps can be performed, e.g. to liquefy the compressed supercritical carbon dioxide or mixture containing the same. The final pressure of the carbon dioxide at the end of the compression process shown in FIG. 2 is typically around 180-200 bar for pipeline transport or re-injection e.g. in depleted oil or gas reservoirs. Typical flow rates in carbon dioxide compression and liquefaction plants are up to 60 kg/s. This implies extremely high power consumptions to drive the compressors and the pump. Additionally, further power is required to circulate the cooling fluid (usually water) in the inter-stage cooling heat exchangers and to remove heat from the cooling fluid.

BRIEF DESCRIPTION OF THE INVENTION

To improve the overall energy efficiency of a carbon dioxide compression system, a system is provided. The system comprises at least a first compressor stage and a second compressor stage arranged in series, at least one inter-stage heat exchanger arranged to receive a compressed gas containing carbon dioxide flowing from the first compressor stage into the second compressor stage and to remove waste heat from the compressed gas, and an energy conversion unit. At least part of the waste heat is recovered and transformed into mechanical energy.

According to a further aspect, the subject matter disclosed herein also concerns a carbon dioxide compression method. In some embodiments, the method comprises flowing a carbon dioxide containing gas through a plurality of compressor stages, removing waste heat from compressed carbon dioxide containing gas flowing from one compressor stage to a next compression stage, and recovering and converting into mechanical energy at least part of the waste heat removed from the carbon dioxide containing gas.

The above brief description sets forth features of various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings wherein.

DETAILED DESCRIPTION OF THE EXEMPLARY EMBODIMENTS OF THE INVENTION

The following detailed description of the embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

In the following description reference will usually be made to compression of carbon dioxide. It shall however be understood that the same principles, methods and devices can be used to process a gas mixture containing carbon dioxide, for example a mixture containing carbon dioxide as the major component in combination with other gaseous components, such as methane or other hydrocarbons.

As will become clearer from the following description, the carbon dioxide compression system disclosed herein is suitable for processing not only carbon dioxide, but also a gaseous flow containing other gaseous components in addition to carbon dioxide, e.g. methane or other hydrocarbons. Whenever reference is made to carbon dioxide, this should be understood as encompassing also a mixture containing carbon dioxide, such as a mixture containing carbon dioxide as a main component, in addition to other gases, unless differently specified.

According to some embodiments, a carbon dioxide compression system (i.e. a system for processing carbon dioxide or a gaseous mixture containing carbon dioxide possibly in combination with other components) is provided, comprising at least a first carbon dioxide compressor stage and a second carbon dioxide compressor stage arranged in series, at least one inter-stage heat exchanger arranged to receive a compressed gas containing carbon dioxide flowing from said first carbon dioxide compressor stage into said second carbon dioxide compressor and to remove waste heat therefrom, and an energy conversion unit, wherein at least part of said waste heat is recovered and transformed into mechanical energy.

As noted above, a carbon dioxide compressor stage shall be understood as a compressor stage which processes carbon dioxide or a mixture containing carbon dioxide.

According to some embodiments the system comprises a fluid path extending through said energy conversion unit and said at least one inter-stage heat exchanger. A cooling fluid circulates in said at least one inter-stage heat exchanger removing waste heat from said compressed gas containing carbon dioxide and is processed in said energy conversion unit through an expansion and compression process to re-cover energy therefrom.

In some embodiments, the energy conversion unit comprises an expander arranged to receive said cooling fluid from said at least one inter-stage heat exchanger and to expand the cooling fluid to recover energy therefrom and to drive a shaft, a condenser fluidly connected to the expander, arranged to condense the expanded cooling fluid, and a pump fluidly coupled to the condenser and arranged to increase the pressure of said condensed cooling fluid.

According to further embodiments, the system comprises at least one heat exchanging unit, a fluid path for an operating fluid, the fluid path extending through the heat exchanging unit and the energy conversion unit, the operating fluid receiving heat in the heat exchanging unit and being processed in the energy conversion unit through an expansion and compression process to recover energy therefrom, and at least one cooling fluid path extending through the inter-stage heat exchanger(s) and the heat exchanging unit(s) for removing waste heat from the compressed gas containing carbon dioxide and transferring the removed waste heat to the operating fluid in the heat exchanging unit.

In some exemplary embodiments of the subject matter disclosed herein, the energy conversion unit comprises an expander arranged to receive the operating fluid from the heat exchanging unit and to expand the operating fluid to recover energy therefrom and drive a shaft, a condenser fluidly connected to the expander, arranged to condense the expanded operating fluid, and a pump fluidly connected to the condenser, arranged to pump the condensed operating fluid to the heat exchanging unit(s).

The energy conversion unit can comprise a Rankine-cycle system and in particular an organic Rankine cycle.

In some embodiments, the system comprises a plurality of serially arranged carbon dioxide compressor stages. Respective inter-stage heat exchangers may be arranged between pairs of sequentially arranged carbon dioxide compressor stages. At least one inter-stage heat exchanger can be arranged between each pair of sequentially arranged compressor stages. However, in some embodiments, the inter-stage heat exchanger can be omitted in some positions along the sequence of compressor stages. Moreover, each inter-stage heat exchanger can be provided with a waste heat recovery arrangement, but this is not mandatory. For example, in some cases one or more inter-stage heat exchangers can be cooled by means of a fluid other than the fluid which transfers the waste heat to the energy conversion unit. Whether or not the waste heat is recovered from a specific heat exchanger of the system depends inter alia upon the kind of energy recovery unit, the rate of gaseous, carbon dioxide containing flow, the temperature ranges at the inlet and outlet of the heat exchanger through which heat is removed from the carbon dioxide containing gaseous flow.

In some embodiments a respective fluid path is provided for each said inter-stage heat exchangers to circulate said cooling fluid in said inter-stage heat exchangers and remove waste hear from compressed gas containing carbon dioxide circulating through each one of said inter-stage heat exchangers.

The fluid paths are in fluid communication with the energy conversion unit, such that the cooling fluid from the inter-stage heat exchangers is processed in the energy conversion unit to recover energy therefrom.

In further embodiments, the system can comprise a plurality of serially arranged carbon dioxide compressor stages. Respective inter-stage heat exchangers can be arranged between pairs of sequentially arranged carbon dioxide compressor stages. A respective fluid path can be provided for each inter-stage heat exchanger to circulate a cooling fluid in the inter-stage heat exchangers and remove waste heat from compressed gas containing carbon dioxide circulating through said inter-stage heat exchangers. At least some of the inter-stage heat exchangers are combined with a respective heat exchange unit. The heat exchange units are arranged such that waste heat removed by said cooling fluid is transferred in said heat exchange units to an operating fluid; said operating fluid being processed in said energy conversion unit to recover energy therefrom.

The system can further include a carbon dioxide pumping section, wherein the compressed gas containing carbon dioxide exiting the last one of the serially arranged compressor stages is further cooled and finally pumped to the final desired pressure.

In some embodiments the gaseous, carbon dioxide containing flow can be liquefied, pumped and finally expanded. In other embodiments the fluid is processed up to the supercritical condition as required, without going through a liquefaction and subsequent pumping phase. Basically, waste heat is recovered from at least one of the heat exchangers of the system and converted in useful energy. This general concept can be embodied in any one of the various compression or compression and liquefaction processes, systems and devices known to those skilled in the art.

In some embodiments the carbon dioxide pumping section comprises a further heat exchanger arranged to receive compressed gas containing carbon dioxide flowing from a last one of the serially arranged carbon dioxide compressor stages, to remove waste heat therefrom. Moreover a pump is arranged in the pumping section, to receive compressed gas containing carbon dioxide from said further heat exchanger and deliver gas containing carbon dioxide in a delivery duct.

A further fluid path can be provided to circulate a cooling fluid through the further heat exchanger in the pumping section, to remove waste heat from the compressed or liquefied fluid containing carbon dioxide between said last carbon dioxide compressor stage and said pump, said further fluid path being arranged to deliver said cooling fluid exiting said further heat exchanger to said energy conversion unit.

The useful power generated by the energy conversion unit can be used directly to electrically or mechanically power one or more components, devices or sections of the compression system.

According to a further aspect, the subject matter disclosed herein also concerns a carbon dioxide compression method. The method can be used to compress and/or to compress and liquefy a gaseous stream consisting of carbon dioxide, or containing carbon dioxide and optionally other additional gaseous components, such as methane or other hydrocarbons. The method can provide for separating and removing one or more secondary fluid components from the main component, i.e. carbon dioxide. The method provides for removing heat from the gaseous flow at one or more steps along the compression or compression and liquefaction process and convert said removed waste heat into useful power, e.g. by means of an energy conversion unit, using a suitable conversion cycle.

In some embodiments of the method disclosed herein the waste heat is converted into mechanical energy by a Rankine cycle, in particular an organic Rankine cycle.

Figure 3:
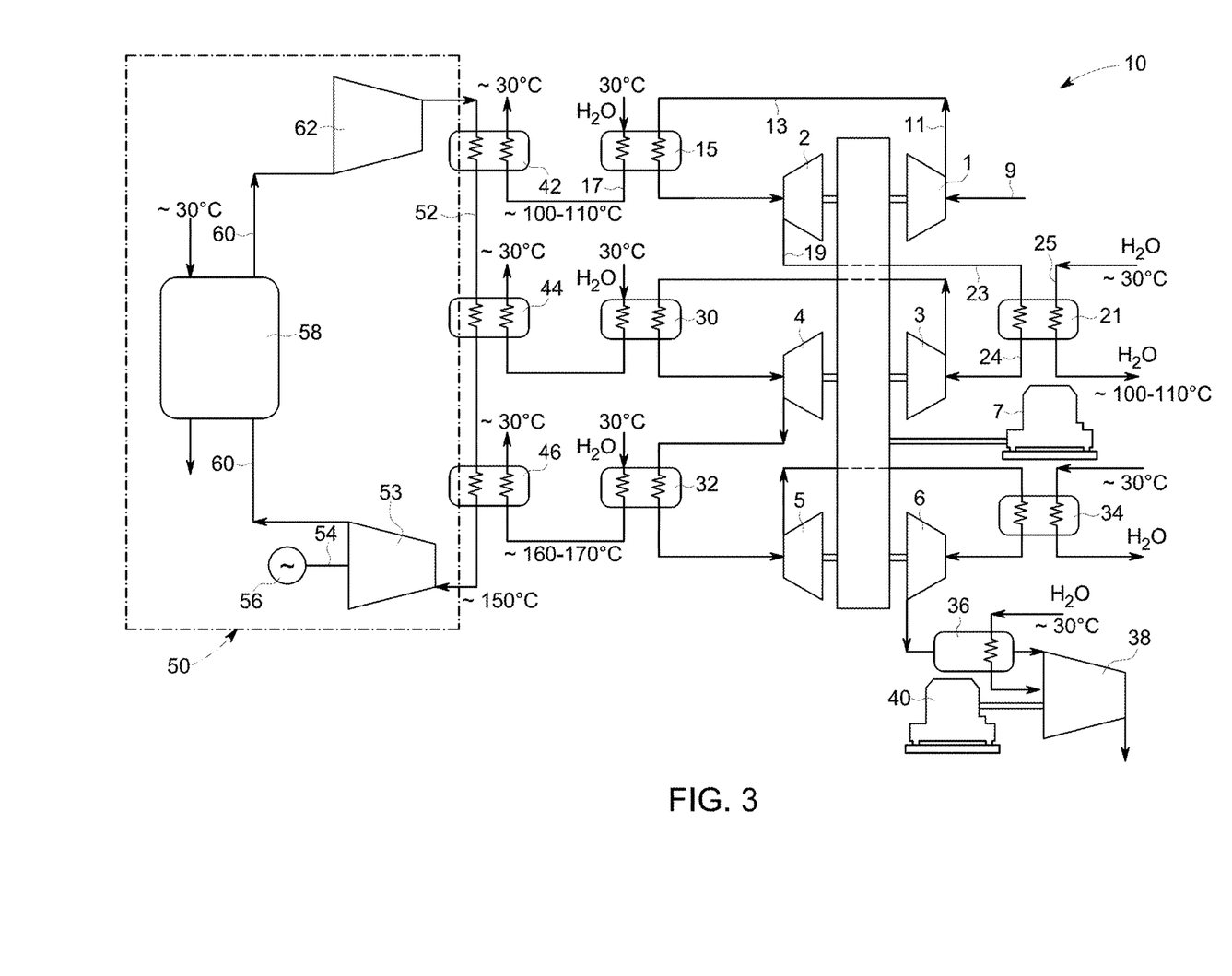
FIGS. 3 to 7 illustrate embodiments of compression and liquefaction systems according to the subject matter disclosed herein.

Referring now to FIG. 3, an embodiment of a carbon dioxide compression system is disclosed. The system is labeled 10 as a whole. In this embodiment the system 10 comprises a plurality of serially arranged compressor stages, each compressor stage comprising one or more compressors, such as centrifugal compressors. In some embodiments, each compressor stage can include a single centrifugal compressor. The embodiment shown in FIG. 3 comprises six serially arranged compressor stages labeled 1 to 6, each comprising one compressor.

The compressor stages 1 to 6 are commonly driven by a compressor driver schematically represented at 7. In other embodiments, more than one driver can be provided. In the diagrammatic representation of FIG. 3 the four compressor stages are paired. Each pair of oppositely arranged compressor stages is driven by a common shaft. A gearbox connects the various shafts to the compressor driver 7. Other embodiments are of course possible.

Carbon dioxide enters the first compressor stage 1 at 9 and exits said first compressor stage 1 at 11. A flow path 13 extends from the exit side of compressor stage 1 to the entry side of compressor stage 2. Along the fluid path 13 a first inter-stage cooler 15 is provided. Said inter-stage cooler will be indicated here below as inter-stage heat exchanger 15. Carbon dioxide flowing through the fluid path 13 across inter-stage heat exchanger 15 is cooled by a cooling fluid, for example water, which flows through a pipe 17. In some embodiments, water can enter the inter-stage heat exchanger 15 at around 30° C. and exit the heat exchanger 15 at around 100-110° C. These values are by way of example only and shall not be considered as limiting the scope of the subject matter disclosed herein.

The cooled carbon dioxide entering the second compressor stage 2 exits said compressor stage 2 at 19, flows through a second inter-stage heat exchanger 21, and the cooled carbon dioxide enters the third compressor stage 3.

Reference numerals 23 and 24 designate the fluid path connecting the output of the second compressor stage 2 to the inter-stage heat exchanger 21 and the latter to the inlet of the third compressor stage 3. Similarly to the inter-stage heat exchanger 15, also the inter-stage heat exchanger 21 is cooled by a flow of cooling fluid, for example cold water, flowing through a pipe 25. Similarly, the carbon dioxide flow delivered from the third compressor stage 3 enters an inter-stage heat exchanger 30 where it is cooled by means of a flow of cooling fluid and enters the fourth compressor stage 4. A further inter-stage heat exchanger 32 is provided between the fourth compressor stage 4 and a fifth compressor stage 5 and a further inter-stage heat exchanger 34 is provided between the outlet of the fifth compressor stage 5 and the inlet of the sixth compressor stage 6. Heat is removed in both inter-stage heat exchangers 32 and 34 by a flow of cooling fluid, for example cold water entering the respective inter-stage heat exchanger at for example 30° C. and exiting at a temperature which depends upon the level of compression of carbon dioxide, as shown in the diagram of FIG. 3 for each inter-stage heat exchanger. It shall be noted that all temperature values disclosed herein are by way of example only and shall not be considered as limiting the scope of the disclosure.

Carbon dioxide delivered by the last compressor stage 6 flows through a further heat exchanger 36, through which a cooling fluid is made to pass to remove heat and bring the carbon dioxide in a supercritical condition, e.g. represented by point E1 in FIG. 1. The carbon dioxide exiting the further heat exchanger 36 is fed to a pump 38 driven by a driver, for example an electric-motor 40 to pump the carbon dioxide until the desired final pressure is achieved (see point E in FIG. 1).

The system can be provided with separators, intended to remove fluids other than carbon dioxide from the compressed carbon dioxide flow. These separators are well known to those skilled in the art and are not shown in the drawings for the sake of clarity.

As diagrammatically shown for the inter-stage heat exchanger 15, 30 and 32 the cooling fluid, which exits the inter-stage heat exchanger at a high temperature, passes through respective heat exchanging units labeled 42, 44 and 46 to remove and recover heat from the cooling fluid. Similar arrangements of heat exchanging units are provided to remove heat from the cooling fluid circulating in the inter-stage heat exchangers 21, 34 and the further heat exchanger 36. The fluid path connecting those inter-stage heat exchangers 21, 34 and 36 to the heat exchanging units and the respective heat exchanging units are not shown for the sake of clarity. In some embodiments, the waste heat removed by inter-stage heat exchangers 21, 34 and by the further heat exchanger 36 can be simply discharged, rather than recovered by a heat exchanging unit. In further embodiments also the waste heat removed by the inter-stage heat exchanger 30 could be dispersed rather than being recovered by heat exchanging unit 40.

The cooling fluid flowing through heat exchanging units 42, 44 and 46 is cooled down by a flow of operating fluid, which is processed in an energy conversion unit 50 to recover at least part of the waste heat removed from the carbon dioxide and converted into mechanical power.

In the example shown, a single flow path 52 is provided to circulate the operating fluid through all the heat exchanging units 42, 44 and 46. In each heat exchanging unit 42, 44 and 46 heat is removed from the cooling fluid coming from the inter-stage heat exchangers 15, 30 and 32 and the recovered heat is transferred to the operating fluid circulating in the fluid path 52. Said operating fluid enters the first heat exchanging unit 42 e.g. at around 30° C. and exits the last heat exchanging unit 46 e.g. at around 150° C. The numerical values are by way of example only and should not be construed as limiting the scope of the disclosure.

The operating fluid circulating in the fluid path 52 and in the energy conversion unit 50 is for example an organic fluid commonly used in an organic Rankine cycle (ORC). A similar arrangement can be provided to recover heat from heat exchanger 21, 34 and 36, but has been omitted for the sake of clarity.

In the embodiments shown in FIG. 3, the energy conversion unit 50 comprises an expander 53, for example a turbine. A shaft 54 of turbine 53 is arranged to drive into rotation a load. In the example shown in FIG. 3 said load comprises an electric generator 56. The flow output of the turbine 53 is connected to a condenser 58 through a flow path 60, which runs through the condenser 58 and extends to a pump 62. The operating fluid is cooled down and condensed in the condenser 58 by means of a cooling fluid, for example water and the condensed operating fluid is pumped again into the flow path 52. The condenser 58 can be cooled by water or air or in any other suitable manner to remove the waste heat from the cooling fluid flowing in the flow path 60. Thus, the operating fluid circulates through the fluid path 52, the turbine 53, the condenser 58 and the pump 62.

The thus described energy conversion unit 50 is therefore designed as an organic Rankine cycle (ORC) device or system, wherein the organic operating fluid is heated for example up to 150° C. when flowing through the heat exchanging units 42, 44, and 46 and is then expanded in turbine 53 to generate mechanical power which is used to drive the load, e.g. the electric generator 56. The expanded organic fluid is then condensed again in the condenser 58 and pumped by pump 62 to enter the first heat exchanging unit 42 at the required pressure.

The arrangement allows to recover part of the waste heat removed by at least some of the inter-stage heat exchangers 15, 21, 30, 32, 34 and by the further heat exchanger 36, from the carbon dioxide flow and convert it into mechanical energy and finally into electric energy by electric generator 56. According to calculations, this arrangement may achieve energy savings in the range of 5-10%, e.g. around 7%.

Figure 4:
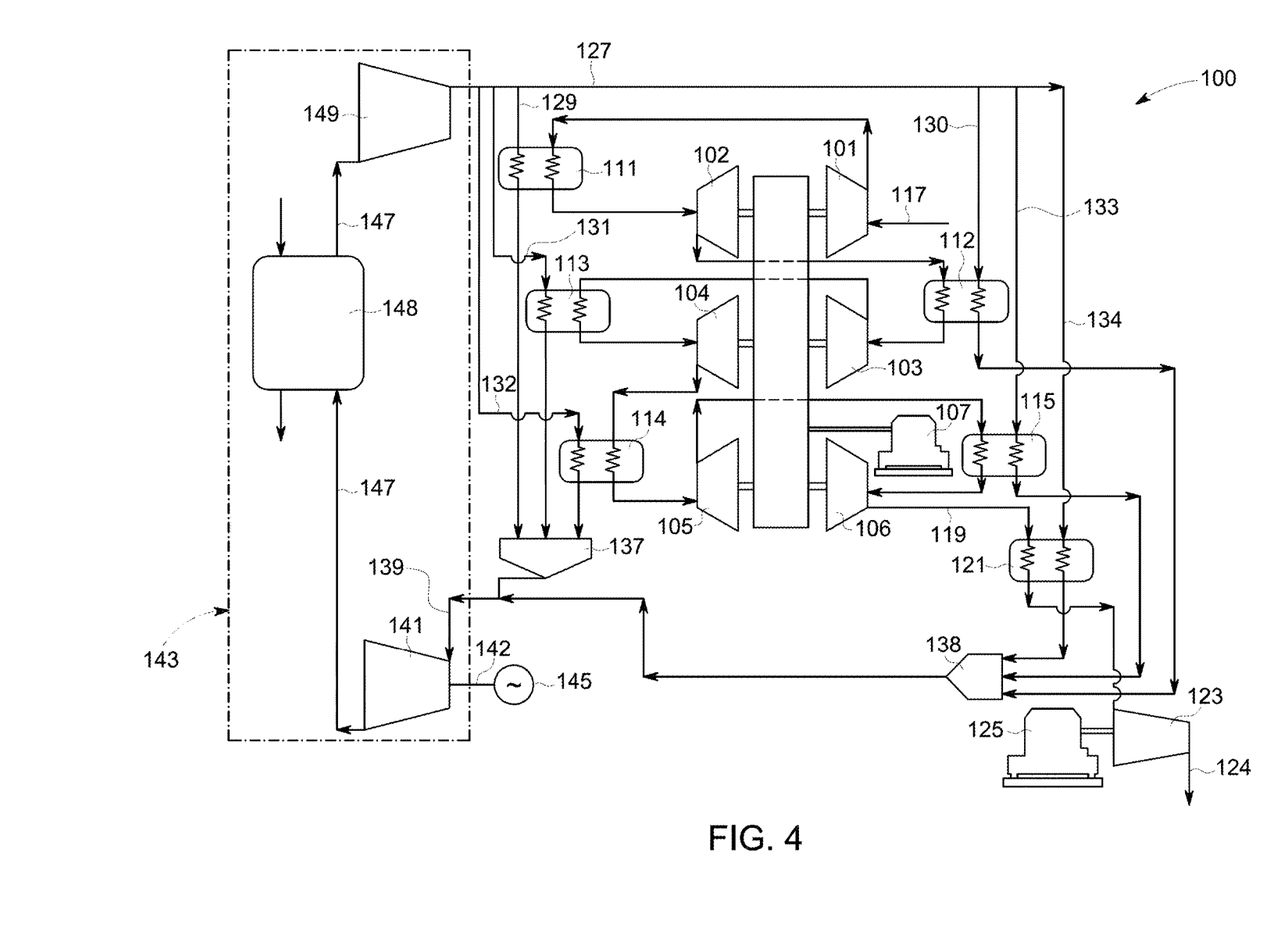

Referring now to FIG. 4, a further embodiment of the carbon dioxide compression system is disclosed. The system is labeled 100 as a whole. In this embodiment the system 100 comprises six compression stages labeled 101, 102, 103, 104, 105, and 106. At least one common driver 107 schematically shown in FIG. 4 is used to drive the sequentially arranged compressors of the compressor stages 101-106. More than one driver 107 can be provided. Each compression stage can include one or more compressors, e.g. centrifugal compressors. The compressor stages 101-106 can be arranged in pair, each pair of compressor stages being driven by a common shaft. The three shafts can rotate at different rotational speeds.

A respective inter-stage heat exchanger is provided to operate as an inter-stage cooler between each pair of sequentially arranged compressor stages 101-106. More specifically, between compressor stages 101 and 102 a first inter-stage heat exchanger 111 is provided. A second inter-stage heat exchanger 112 is arranged between the second compressor stage 102 and the third compressor stage 103. A third inter-stage heat exchanger 113 is arranged between the third compressor stage 103 and the fourth compressor stage 104. A fourth inter-stage heat exchanger 114 is arranged between the fourth compressor stage 104 and the fifth compressor stage 105. Finally, a fifth inter-stage heat exchanger 115 is arranged between the fifth compressor stage 105 and the sixth compressor stage 106.

The carbon dioxide enters the first compressor stage 101 at 117 and exits the last compressor stage 106 at 119. The carbon dioxide exiting the last compressor stage 106 is chilled and further compressed to a supercritical condition in a station downstream the last compressor stage 106. Said station comprises schematically a further heat exchanger 121, arranged between the sixth compressor stage 106 and a pump 123, from which carbon dioxide in a supercritical condition is delivered at 124. The pump is driven by a pump driver 125, for example an electric motor.

The five inter-stage heat exchangers 111-115 and the further heat exchanger 121 are provided to remove waste heat from the carbon dioxide and for that purpose a cooling fluid is circulated through said heat exchangers. A distributor 127 is provided, from which a cooling fluid is delivered via pipes 129, 130, 131, 132, 133, 134 to the respective heat exchangers 111, 112, 113, 114, 115, 121.

The cooling fluid exiting the heat exchangers 111-115, 121 is then collected by two collectors 130 and 138 and flows in a pipe 139, which delivers the heated cooling fluid to an expander, for example a turbine 141 of an energy conversion unit 143. A shaft 142 of the turbine 141 drives a load, for example an electric generator 145 to produce electric power exploiting at least part of the heat recovered by the cooling fluid. The expanded cooling fluid flows then through a fluid path 147 across a condenser 148 from which the cooled down and condensed cooling fluid is delivered to a pump 149. The pump 149 pumps the chilled and condensed cooling fluid up to the final pressure before delivering it to the distributor 127. The condenser 148 can be cooled by water or air or in any other suitable manner to remove the waste heat from the cooling fluid flowing in the flow path 147.

Different from the embodiment of FIG. 3, in the embodiment now disclosed with reference to FIG. 4, the cooling fluid which removes heat from the inter-stage cooling heat exchanger 111-115 and from the further heat exchanger 21 is the same operative fluid used in the energy conversion cycle performed by the energy conversion unit 143, i.e. for example an organic fluid for an organic Rankine cycle device. Using the same fluid to remove heat from the inter-stage coolers and to operate the turbine of the energy conversion unit reduces heat losses and increases the overall efficiency of the system.

Figure 5:
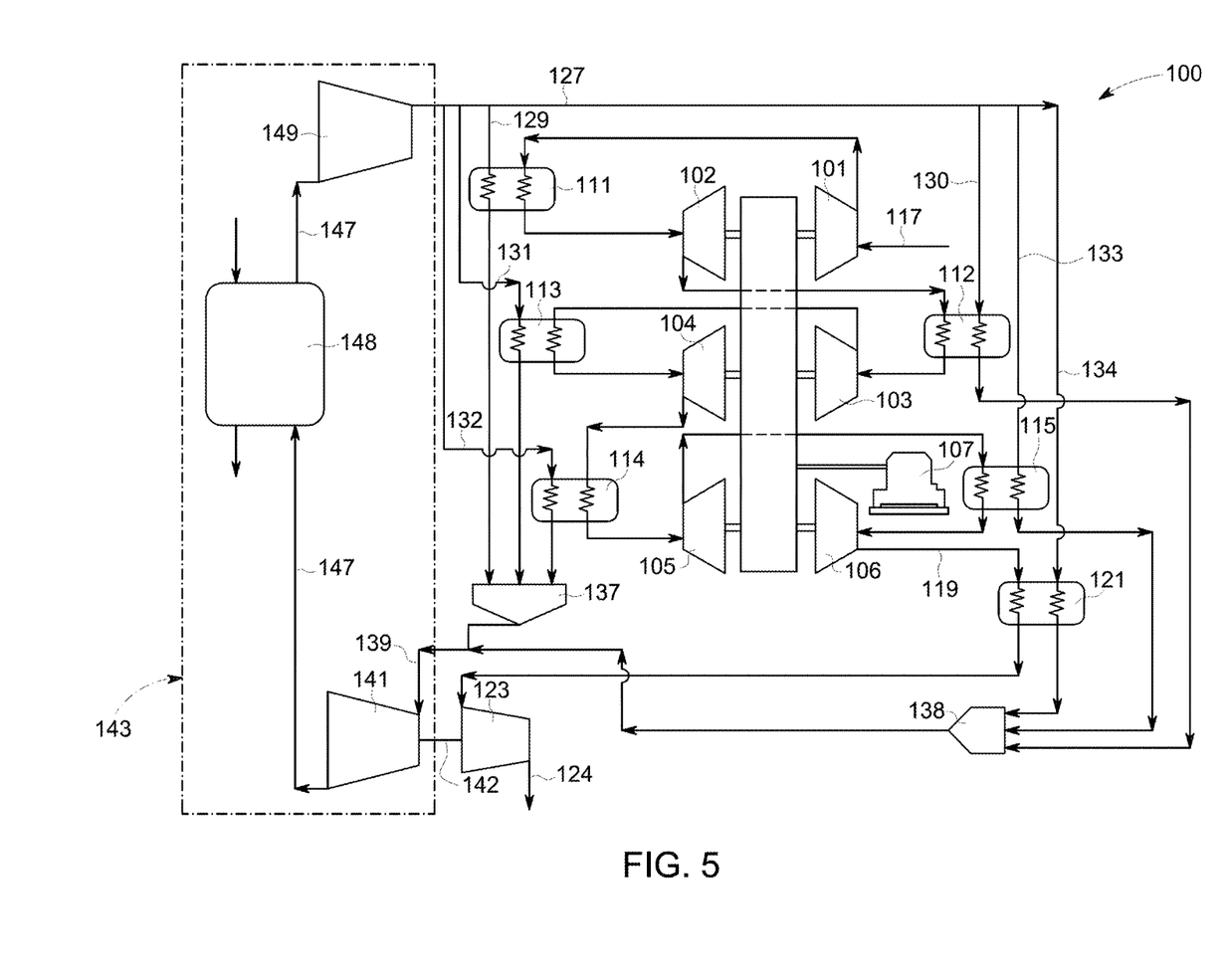

FIG. 5 illustrates a further embodiment of a system according to the subject matter disclosed herein. The same reference numbers indicate the same or equivalent parts as shown in FIG. 4. Those parts will not be described again.

The system of FIG. 5 differs from the system of FIG. 4 because the pump 123 is not driven by an electric driver 125, but directly by the turbine 141 of the energy conversion unit 143. In this embodiment, therefore, the mechanical power recovered by the expansion of the cooling fluid in turbine 141 is used via shaft 142 to directly drive a component of the system. In FIG. 4, conversely, the mechanical energy produced by the turbine 141 is used to produce electric energy which can be used in turn to drive the pump driver 125.

The same approach can be used also in the embodiment of FIG. 3. Also in that case the mechanical power recovered in the energy conversion unit 50 can be used to drive directly the pump 58 rather than to drive an electric generator 56.

Figure 6:
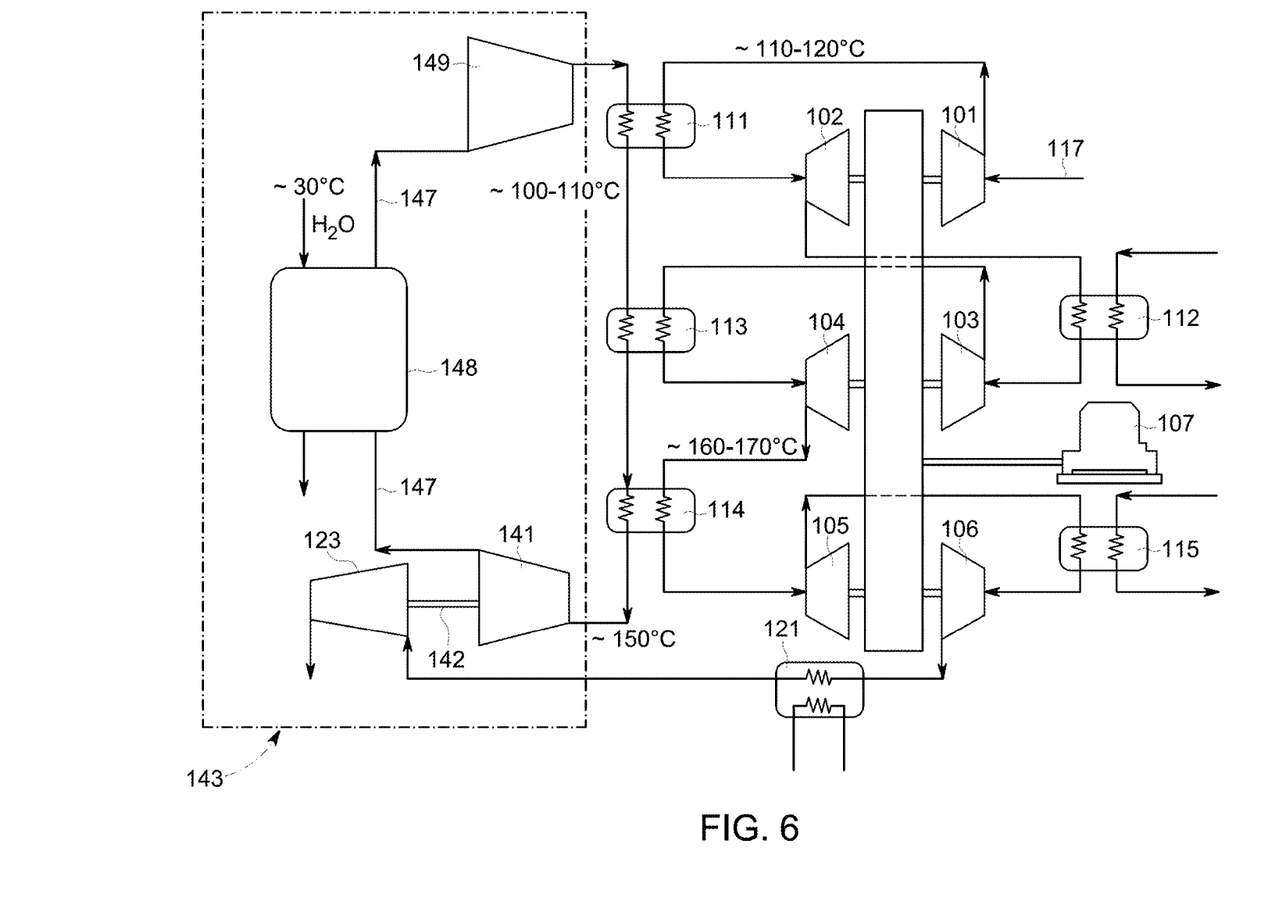

FIG. 6 illustrates a further embodiment of a compression system. The same reference numbers designate the same or equivalent parts as in FIGS. 4 and 5 and will not be described again. In this embodiment the cooling fluid which circulates in the energy conversion unit 143 is circulated across the inter-stage heat exchangers 111, 113, and 114 in series rather than in parallel as shown in FIGS. 4 and 5. In the embodiment shown, moreover, the inter-stage heat exchangers 112, 115 and the further heat exchanger 121 are not connected to the energy conversion unit 143. The latter three mentioned heat exchangers are cooled by separate cooling circuits, which do not recover the heat towards the energy conversion unit 143. In other embodiments a separate cooling fluid path could be provided which connects the pump 149 with the heat exchangers 112, 115 and 121 in series, so that the entire waste heat removed from the carbon dioxide is recovered in the energy conversion unit 143.

In the embodiment of FIG. 6, moreover, similarly to the embodiment of FIG. 5, the cooling fluid is expanded in the turbine 141 which drives via shaft 142 directly the pump 123. In other embodiments, not shown, the turbine 141 could be used to drive as shaft 142 which in turn drives into rotation an electric generator 145 or a different mechanical load.

Figure 7:
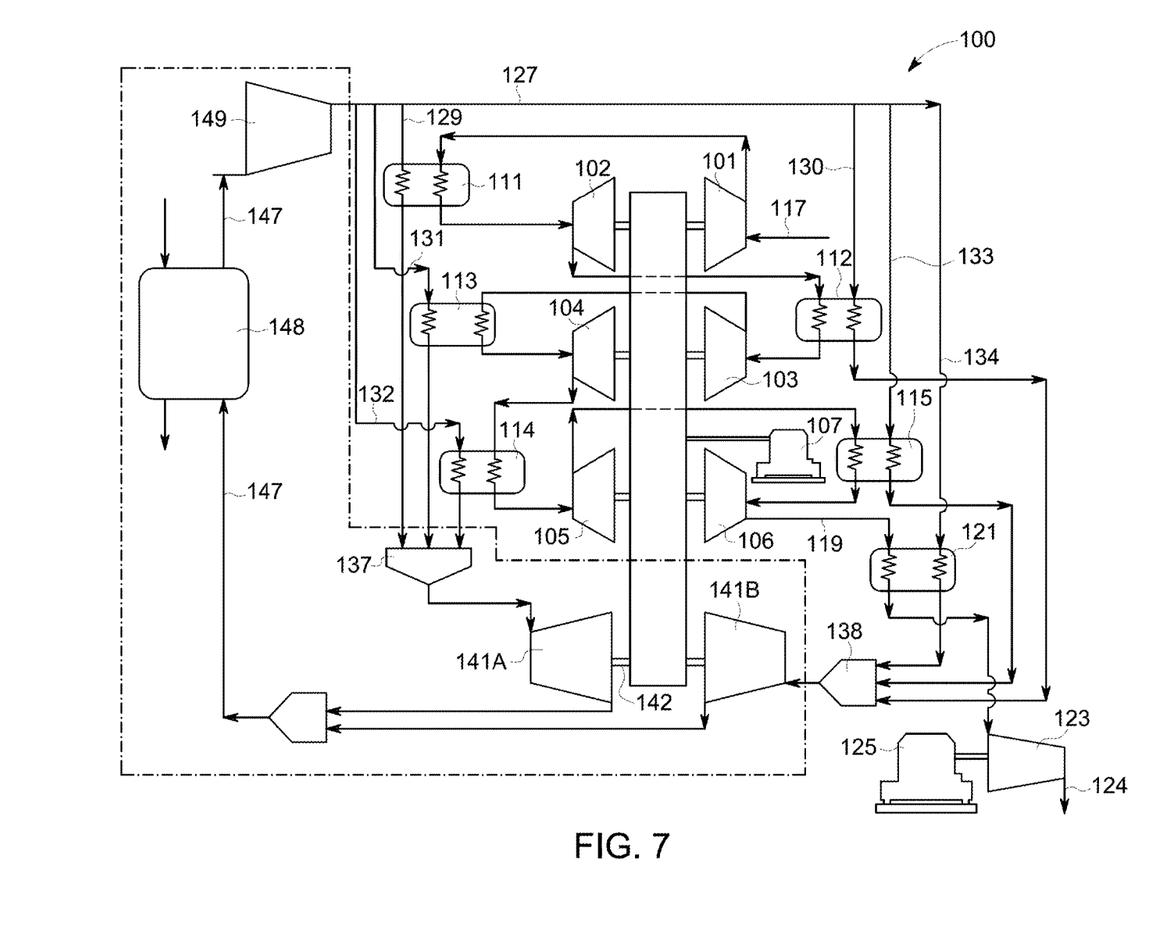

A further embodiment of the carbon dioxide compression system is illustrated in FIG. 7. The same reference numbers are used to indicate the same or equivalent elements as in FIG. 4. Those elements are not disclosed again.

Differently from the embodiment of FIG. 4, in the embodiment of FIG. 7 the cooling fluid exiting the inter-stage heat exchangers 111-115 and the further heat exchanger 121 is separately delivered towards two turbines (expanders) 141A, 141B, which are used to generate mechanical power to drive the compressors of the compressor stages 101-106. More specifically, in this embodiment the cooling fluid collected from the inter-stage heat exchangers 111, 113, 114 are collected in a collector 137 and enter the first turbine 141A. The cooling fluid collected by collector 138 from the inter-stage heat exchangers 112, 115 and the further heat exchanger 121 is delivered to the second turbine 141B. The two turbines 141A and 141B can be connected by a common mechanical shaft 142. In other embodiments, two separate mechanical shafts can be provided, one for each turbine 141A, 141B. In yet further embodiments, not shown, a single turbine can be used for the entire flow of cooling fluid which, in that case, can be collected in one duct only as shown in the embodiment of FIG. 4. In such case the single turbine will be connected by a single mechanical shaft to the train of compressors to supply mechanical energy to drive the compressors.

Since the power recovered by the energy conversion unit 143 is only a fraction of the power required to drive the entire set of compressor stages, the compressor driver 107 is still required but will absorb a reduced amount of power.

While the disclosed embodiments of the subject matter described herein have been shown in the drawings and fully described above with particularity and detail in connection with several embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A carbon dioxide compression system comprising:
 a plurality of serially positioned compressor stages;
 at least one of a plurality of inter-stage heat exchangers arranged to receive a compressed gas containing carbon dioxide flowing between the serially positioned compressor stages and to remove waste heat from the compressed gas, wherein the plurality of inter-stage heat exchangers comprises respective inter-stage heat exchangers arranged between pairs of the compressor stages arranged in series;
 an energy conversion unit comprising an expander, a condenser, a fluid, and a pump configured to recover and transform at least part of the waste heat into mechanical energy;
 a fluid path for each of the inter-stage heat exchangers configured to circulate the fluid in the inter-stage heat exchangers and remove waste heat from compressed gas containing carbon dioxide circulating through the inter-stage heat exchangers, each of the fluid paths is in fluid communication with the energy conversion unit, such that the fluid from the inter-stage heat exchangers is processed in the energy conversion unit to recover energy from the fluid and heat the fluid, wherein the fluid circulates in the at least one inter-stage heat exchanger removing waste heat from the compressed gas containing carbon dioxide, the fluid is processed in the energy conversion unit through an expansion and compression process of the fluid to recover energy from the fluid, and wherein the fluid flows into the condenser, is condensed, and the condensed fluid then flows to the pump, and wherein the fluid operates the expander and the expander is a turbine;

a pumping section comprising a further heat exchanger arranged to receive compressed gas containing carbon dioxide flowing from a last one of the serially positioned compressor stages and configured to remove waste heat from the compressed gas, and a second pump arranged to receive compressed gas containing carbon dioxide from the further heat exchanger and to deliver gas containing carbon dioxide in a delivery duct; and a further fluid path configured to circulate the fluid through the further heat exchanger to remove waste heat from the compressed gas containing carbon dioxide between the last one of the compressor stages and the second pump, wherein the further fluid path is configured to deliver the fluid exiting the further heat exchanger to the expander of the energy conversion unit.

2. The system according to claim 1, wherein the energy conversion unit comprises a Rankine-cycle system.

3. The system according to claim 2, wherein the Rankine-cycle system is an organic Rankine-cycle.

4. A carbon dioxide compression system comprising:
a plurality of serially positioned compressor stages;
at least one of a plurality of inter-stage heat exchangers arranged to receive a compressed gas containing carbon dioxide flowing between the serially positioned compressor stages and to remove waste heat from the compressed gas, wherein the plurality of inter-stage heat exchangers comprises respective inter-stage heat exchangers arranged between pairs of the compressor stages arranged in series;
an energy conversion unit comprising an expander, a condenser, a fluid, and a pump configured to recover and transform at least part of the waste heat into mechanical energy;
a fluid path for each of the inter-stage heat exchangers configured to circulate the fluid in the inter-stage heat exchangers and remove waste heat from compressed gas containing carbon dioxide circulating through the inter-stage heat exchangers, each of the fluid paths is in fluid communication with the energy conversion unit, such that the fluid from the inter-stage heat exchangers is processed in the energy conversion unit to recover energy from the fluid and heat the fluid, wherein the fluid circulates in the at least one inter-stage heat exchanger removing waste heat from the compressed gas containing carbon dioxide, the fluid is processed in the energy conversion unit through an expansion and compression process of the fluid to recover energy from the fluid, and wherein the fluid flows into the condenser, is condensed, and the condensed fluid then flows to the pump, and wherein the fluid operates the expander and the expander is a turbine;

a pumping section comprising a further heat exchanger arranged to receive compressed gas containing carbon dioxide flowing from a last one of the serially positioned compressor stages and configured to remove waste heat from the compressed gas, and a second pump arranged to receive compressed gas containing carbon dioxide from the further heat exchanger and to deliver gas containing carbon dioxide in a delivery duct;

a further fluid path configured to circulate the fluid through the further heat exchanger to remove waste heat from the compressed gas containing carbon dioxide between the last one of the compressed stages and the second pump; and a further heat exchange unit configured to transfer waste heat from the fluid circulating from the further heat exchanger to the fluid.

5. The system according to claim 1, wherein the expander of the energy conversion unit is configured to drive an electric energy generator.

6. The system according to claim 1, wherein the expander of the energy conversion unit is configured to supply mechanical energy directly to at least one of the compressor stages.

7. The system according to claim 1, wherein the expander of the energy conversion unit is configured to supply mechanical power to the pump.

8. A carbon dioxide compression method, the method comprising:
flowing a carbon dioxide containing gas through a plurality of compressor stages arranged in series;
receiving a compressed gas containing carbon dioxide flowing between subsequent compressor stages and removing waste heat from compressed carbon dioxide containing gas flowing between subsequent compressor stages using at least one of a plurality of inter-stage heat exchangers;
recovering and transforming into mechanical energy at least part of the waste heat removed from the carbon dioxide containing gas in an energy conversion unit through an expansion and compression process;
providing a plurality of fluid paths extending through each of the plurality of inter-stage heat exchangers; and each of a plurality of heat exchanging units and circulating a fluid in the plurality of inter-stage heat exchangers to remove waste heat from the gas containing carbon dioxide; and
circulating a fluid in the inter-stage heat exchangers to remove waste heat from the gas containing carbon dioxide,
wherein each of the fluid paths is in fluid communication with the energy conversion unit, such that the fluid from the inter-stage heat exchangers is processed in the energy conversion unit to recover energy from the fluid, and
wherein the fluid circulates in the at least one inter-stage heat exchanger removing waste heat from the compressed gas containing carbon dioxide, the fluid is processed in the energy conversion unit through an expansion and compression process of the fluid along a flow path to recover energy from the fluid, and wherein the fluid flows into a condenser in the energy conversion unit, gets condensed, and the condensed fluid then flows to a pump in the energy conversion unit and is recirculated into the flow path, wherein the fluid operates an expander, wherein the expander is a turbine circulating the fluid through a further heat exchanger arranged to receive compressed gas containing carbon dioxide flowing from a last one of the serially positioned compressor stages to remove waste heat from the compressed gas; and moving the fluid exiting the further heat exchanger to the expander of the energy conversion unit.

9. The method according to claim 8, wherein the waste heat is converted into mechanical energy by a Rankine cycle.

10. The method according to claim 9, wherein the waste heat is converted into mechanical energy by an organic Rankine cycle.

11. The method according to claim 8, wherein the mechanical energy is at least partly used to power at least one of the compressor stages.

12. The method according to claim 8, wherein the mechanical energy is at least partly converted into electric energy.

13. The method according to claim 8, further comprising cooling and pumping the carbon dioxide containing gas in a pumping section comprising the inter-stage heat exchanger and a pump.

14. The method according to claim 13, further comprising recovering and converting into mechanical energy at least part of the heat removed by the inter-stage heat exchanger of the pumping section.

15. The method according to claim 13, wherein the mechanical energy is at least partly used to power the pump of the pumping section.

16. The method according to claim 8, wherein the fluid is expanded in an expander to convert heat into mechanical energy.

17. The method according to claim 8, wherein the waste heat is removed by a fluid and the fluid is expanded in an expander to convert heat into mechanical energy.

* * * * *